United States Patent
Yagnik

(10) Patent No.: US 8,879,862 B2
(45) Date of Patent: *Nov. 4, 2014

(54) METHOD AND APPARATUS FOR AUTOMATICALLY SUMMARIZING VIDEO

(71) Applicant: Google Inc., Mountain View, CA (US)

(72) Inventor: Jay N. Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/183,070

(22) Filed: Feb. 18, 2014

(65) Prior Publication Data

US 2014/0161351 A1   Jun. 12, 2014

Related U.S. Application Data

(63) Continuation of application No. 11/454,386, filed on Jun. 15, 2006, now Pat. No. 8,699,806.

(60) Provisional application No. 60/791,869, filed on Apr. 12, 2006.

(51) Int. Cl.
*G06K 9/46* (2006.01)
*G06F 17/30* (2006.01)
*G06K 9/00* (2006.01)

(52) U.S. Cl.
CPC ...... *G06K 9/00536* (2013.01); *G06F 17/30802* (2013.01); *G06K 9/00711* (2013.01); *G06F 17/30787* (2013.01); *G06F 17/30843* (2013.01)
USPC .......................................... 382/236

(58) Field of Classification Search
None
See application file for complete search history.

(56) References Cited

U.S. PATENT DOCUMENTS 6,535,639 B1 * 3/2003 Uchihachi et al. ............ 382/225

OTHER PUBLICATIONS

Shi Lu, et al., "A Novel Video Summarization Framework for Document Preparation and Archival Applications," IEEEAC paper#1415, 2005, IEEE.*
Cooper Matthew, et al., "Summarizing Video using Non-Negative Similarity Matrix Factorization," IEEE, 2002, pp. 25-28.*
Zhu, Xingquan, et al. "Exploring video content structure for hierarchical summarization." Multimedia Systems 10.2 (Aug. 2004): 98-115.*

* cited by examiner

*Primary Examiner* — Kim Vu
*Assistant Examiner* — Fred Hu
(74) *Attorney, Agent, or Firm* — Fenwick & West LLP

(57) ABSTRACT

One embodiment of the present invention provides a system that automatically produces a summary of a video. During operation, the system partitions the video into scenes and then determines similarities between the scenes. Next, the system selects representative scenes from the video based on the determined similarities, and combines the selected scenes to produce the summary for the video.

21 Claims, 3 Drawing Sheets

METHOD AND APPARATUS FOR AUTOMATICALLY SUMMARIZING VIDEO

RELATED APPLICATIONS

This application is a continuation of U.S. patent application Ser. No. 11/454,386, filed on Jun. 15, 2006, which claims priority under 35 U.S.C. §119(e) to U.S. Provisional Application Ser. No. 60/791,869, entitled "Transformed Similarity Score Optimization: An Approach to Generic Video Summarization," by inventor Jay N. Yagnik, filed Apr. 12, 2006, all of which are incorporated by reference in their entirety.

BACKGROUND

1. Field of the Invention

The present invention relates computer-based techniques for manipulating video data. More specifically, the present invention relates to a computer-based technique for automatically summarizing a video.

2. Related Art

The recent proliferation of high-bandwidth Internet connections and associated developments in content-distribution technologies presently make it possible for millions of users to efficiently access video content on the Internet. These developments have led to a tremendous increase in the amount of video content that is being downloaded from the Internet. Internet users routinely view video clips from numerous web sites and portals to obtain various types of information and entertainment. At the same time, a number of video-sharing web sites have been recently launched, which are dedicated to sharing and distributing video clips.

Unlike other distribution channels for video content, the Internet enables consumers to preview short summaries of videos. This enables a consumer to obtain more information about a video before viewing and/or buying the entire video.

However, generating an effective summary for a video is a challenging a task. A summary should ideally be an interesting and representative version of the original video, so that the viewer is motivated to view or buy the original video. At present, the process of generating summaries is an extremely time-consuming manual process, which is impractical for more than a small number of videos.

Hence, what is needed is a method and an apparatus for automatically summarizing a video without the above-described problems.

SUMMARY

One embodiment of the present invention provides a system that automatically produces a summary of a video. During operation, the system partitions the video into scenes and then determines similarities between the scenes. Next, the system selects representative scenes from the video based on the determined similarities, and combines the selected scenes to produce the summary for the video.

In a variation on this embodiment, while partitioning the video into scenes, the system first extracts feature vectors for sampled frames in the video. Next, the system detects shot boundaries based on distances between feature vectors for successive sampled frames. The system also produces a frame-similarity matrix, wherein each element in the frame-similarity matrix represents a distance between feature vectors for a corresponding pair of sampled frames. Next, the system uses the frame-similarity matrix, the detected shot boundaries and a dynamic-programming technique to compute a shot-similarity matrix, wherein each element in the shot-similarity matrix represents a similarity between a corresponding pair of shots. Finally, the system determines the scene boundaries by selectively merging successive shots together based on the computed similarities between the successive shots and also based on audio breaks in the video.

In a further variation, extracting the feature vector for a sampled frame involves producing a color histogram for the sampled frame.

a further variation, the distance between two feature vectors $F_A$ and $F_B$ is:

$$1 - \frac{F_A \cdot F_B}{|F_A||F_B|}.$$

In a further variation, while detecting the shot boundaries, the system uses an adaptive-threshold technique, which computes a distance between feature vectors for successive frames divided by a maximum distance between successive feature vectors in a preceding window of frames.

In a further variation, determining the similarities between the scenes involves: using the frame-similarity matrix, the determined scene boundaries and a dynamic-programming technique to produce a scene-similarity matrix. It also involves scoring the scenes based on a metric that rewards scenes which are different from other scenes in the video, and that also rewards scenes which are similar to other scenes in the video.

In a further variation, selecting the representative scenes involves selecting the representative scenes based on a total score for the selected scenes subject to a time constraint.

In a variation on this embodiment, selecting the representative scenes involves clustering similar scenes together and selecting at most one scene from each cluster.

In a variation on this embodiment, selecting the representative scenes involves using a dynamic-programming technique to select the representative scenes.

One embodiment of the present invention provides a system that automatically selects a frame from a video to represent the video. During operation, the system extracts feature vectors for sampled frames in the video. Next, the system determines similarities between sampled frames by determining distances between feature vectors for the samples frames. The system uses the determined similarities to select a sampled frame to represent the video, wherein the selected frame is most similar to the other sampled frames in the video.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

One embodiment of the present invention provides a technique for automatically summarizing a video, wherein the technique considers both "events" in the video and the "flow" of the video.

Figure 1:
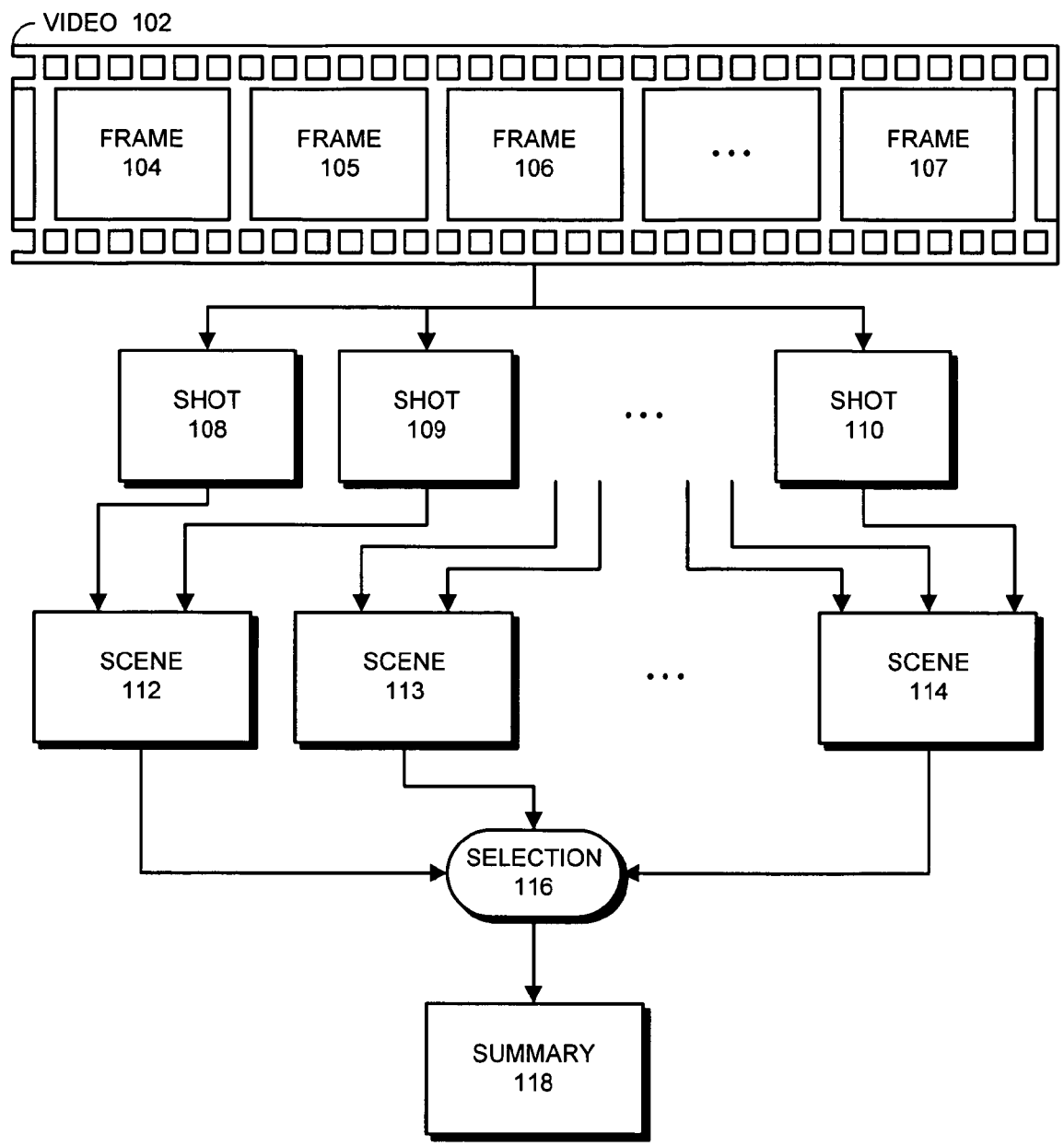
FIG. 1 illustrates the process of summarizing a video in accordance with an embodiment of the present invention.

Referring to FIG. 1, the general process first extracts features from frames 104-107 in video 102 and uses these features to detect transitions between features. These transitions are used along with audio breaks to divide the video into "shots" 108-110. For example, in one embodiment of the present invention, the features are color-value histograms for frames of the video and the shot boundaries are defined by abrupt transitions between features for successive frames in the video. These abrupt transitions are likely to be associated with "cuts" made during the shooting process for the video. In contrast, moving objects or camera motion within the video are not likely to cause such abrupt transitions, and are hence unlikely to be detected as shot boundaries.

Next, successive shots 108-110 are selectively merged into scenes 112-114 based on similarities between the shots and the audio breaks in the video 102.

Finally, similarities are computed between the scenes, and scenes are automatically selected for summary 118 based on the computed similarities and a time constraint. This entire process is described in more detail below with reference to FIG. 2.

Detailed Process

Figure 2:
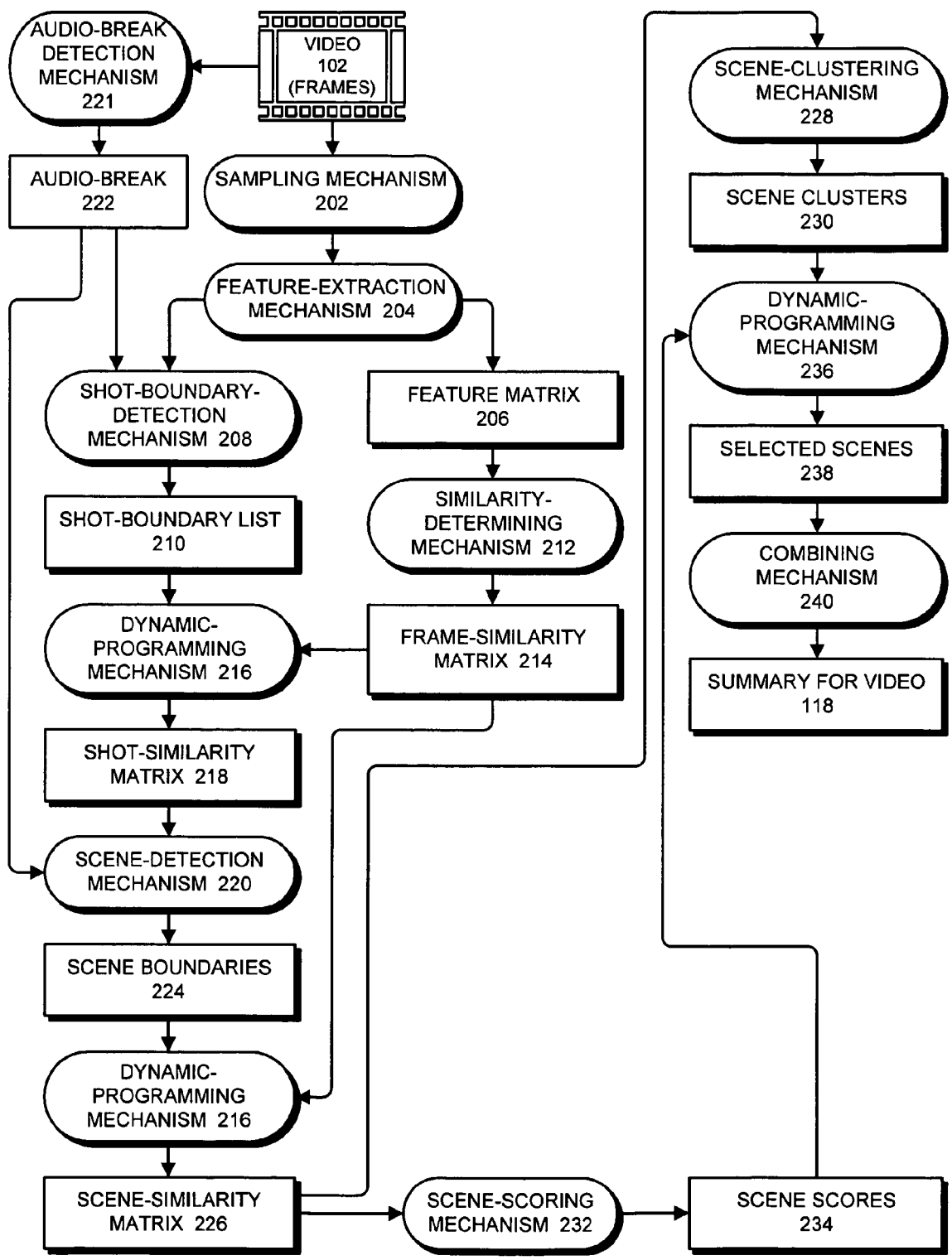
FIG. 2 presents a detailed flow diagram illustrating the process of summarizing a video in accordance with an embodiment of the present invention.

FIG. 2 presents a more-detailed flow diagram illustrating the process of summarizing a video in accordance with an embodiment of the present invention. The system starts by receiving a video 102, which is comprised of a number of frames.

Next, a sampling mechanism 202 samples frames from video 102. These sampled frames feed into a feature-extraction mechanism 204, which extracts a "feature" for each sampled frame. In one embodiment of the present invention, each frame is partitioned into a 4×6 array of tiles and the system extracts color histogram features for each of these tiles. The histogram provides 8 bins for each color, making the total feature vector length 4×6×8×8×8=12288. (Note that the terms "feature" and "feature vector" are used interchangeably throughout this specification.)

The features feed into feature matrix 206 for further processing as is described below. They also feed into shot-boundary-detection mechanism 208, which detects shot boundaries by comparing features for consecutive frames and by considering audio breaks 222 (which are detected by audio-break detection mechanism 221). These shot boundaries are compiled into a shot-boundary list 210. In one embodiment of the present invention, shot-boundary-detection mechanism 208 uses an adaptive thresholding technique. This technique compares the variations of features within a causal window of length w to accurately localize the beginning of fades and dissolves. A shot change is detected if the following holds:

$$\frac{d(F_c, F_{c-1})}{\max_{2 \le k \le w} d(F_{c-k}, F_{c-k-1})} \ge r_{thresh}$$

This technique effectively provides an adaptive threshold which is raised for a sequence of frames containing motion and which is lowered for a sequence of static frames. This adaptive threshold makes it unlikely for the system to classify fast motion as a shot change.

Note that video 102 can be sampled at different intervals for different purposes. For example, video 102 can be sampled once every 30 frames to produce features for feature matrix 206, while video 102 is sampled every 5 frames for shot-boundary detection mechanism 208. Note that more samples are needed to accurately detect shot boundaries, but the corresponding features do not need to be saved because the shot boundaries are detected based on a small window of preceding frames.

Similarity-determining mechanism 212 compares features from feature matrix 206 to produce a frame-similarity matrix 214, which contains values representing similarities between pairs of features. In one embodiment of the present invention, these similarities are expressed as "cosine distances" between the feature vectors for the images. More specifically, we can define the following distance metric between two frames A and B:

$$d(F_A, F_B) = 1 - \frac{F_A \cdot F_B}{|F_A||F_B|}$$

where $F_A$ and $F_B$ are feature vectors corresponding to frames A and B.

Next, shot-boundary list 210 is used to delineate shots in video 102, and then a dynamic-programming mechanism 216 is used to compute similarities between shots. These computed similarities are then used to populate a shot-similarity matrix 218.

Computing similarities between shots can be a complicated problem. Shots can vary in speed while capturing the same content, or parts of shots can be same. To account for such speed variations and similarities, one embodiment of the present invention uses the following recurrence relationship to compute the similarity between two shots s1 and s2 based on the best alignment between the shots:

$$S(s1_{start:end}, s2_{start:end}) = \max \begin{cases} S(s1_{start:end}, s2_{start+1:end}) \\ S(s1_{start+1:end}, s2_{start:end}) \\ S(s1_{start+1:end}, s2_{start+1:end}) + \\ \left( \frac{1 - d(F_{s1_{start}}, F_{s2_{start}})}{\min(l_1, l_2)} \right) \end{cases}$$

where x:y denotes all the frames from frame x through frame y.

The above recurrence relationship can be solved by using a dynamic programming technique which has a computational complexity of $O(l_1, l_2)$, where $l_1$ and $l_2$ are the lengths of the two shots.

Next, scene-detection mechanism 223 uses the shot-similarity matrix 218 along with audio breaks 222 to determine scene boundaries 224. This generally involves using the audio breaks and the similarities between shots to selectively merge successive shots into scenes. Given the shot-similarity matrix 218, there are many ways to detect scenes from it. One embodiment of the present invention treats consecutive shots, which have similarity in the top 5% of all-to-all similarity values to be part of the same scene. However, many alternative techniques exist.

The scene boundaries are used to delineate scenes within video 102, and the same dynamic-programming mechanism 216 is used to compute similarities between scenes (instead of between shots as was done previously). These computed similarities are then used to populate a scene-similarity matrix 226.

A scene-scoring mechanism 232 uses information from scene-similarity matrix 226 to compute scene scores 234 based on similarities with other scenes. Once we have an all-to-all shot similarity matrix 218, we calculate a score for each scene, which is defined as:

$$G(s) = w_{rel}\left(\sum_i |S(s, s_i) - \mu|\right) + w_{motion}M(s) + w_{audio}A(s)$$

where $$\mu = \frac{\sum_i s_i}{n}.$$

This score captures the relative importance of the scene along with its motion and audio content. The basic idea is that important scenes are either very representative of the video or ones that are completely distinct from other scenes in the video. Intuitively, this means that in a story revolving around one set (or a game or talk show) it will pick up scenes from that set as well as some high motion-audio content shots from outside also. The score for a scene is affected by how away is it from the mean cohesiveness of the video. So for movies and other video material which does not stay in one setting the average cohesiveness would be low. So scenes of higher similarity to others are more likely to be picked up.

Information from scene-similarity matrix 226 is also used by scene-clustering mechanism 228 to produce scene clusters 230 containing similar scenes. One embodiment of the present invention performs an agglomerative-clustering step which bundles similar shots include clusters and that selects at most one shot from each cluster to appear in the summary. For example, the threshold for clustering can be derived from the scene similarity matrix as the fourth quartile of the distribution of similarities. At the end of clustering, we have a set of clusters each having one or more shots.

The scene scores 234 and the scene clusters 230 feed into another dynamic-programming mechanism 236, which selects scenes to include in the summary. In doing so, the system selects scenes in a manner that optimizes the total scene score while meeting the time line of the summary, and also does not include very similar scenes together (since similar shots are likely to have similar high scores). Hence, the problem is to pick zero or one scene from each cluster to form the final summary such that the sum total of the scores is maximized.

$$\max \sum_{i=1 \ldots k} G(C_i(bestshot))$$

Where $C_i$(bestshot) is the shot selected from cluster I, and the value of G is zero if no shot is selected from that cluster.

Because trying all possible combinations is computationally intractable, one embodiment of the present invention uses a dynamic programming technique to perform this optimization. We need finite state space for the dynamic program to find an optimal solution. So we divide our summary time into divisions of 0.5 seconds each. The dynamic program is as follows:

$$\text{Score}(slist, stime, i) = \begin{cases} \max_j \begin{pmatrix} G(C_i(j)) + \text{Score}([slistj]), \\ stime - \text{time}(j), i-1 \end{pmatrix} \\ \text{s.t. } \text{time}(j) < stime \\ 0 \end{cases}$$

This solves for the best combination of scenes in the given time constraint that maximizes our weighted score and also suppresses scenes from the same clusters from appearing together.

Finally, combining mechanism 240 combines the selected scenes together to form summary 118.

Another embodiment of the present invention selects a single frame from the video to represent the video. In this embodiment, the system similarly extracts feature vectors for sampled frames in the video, and similarly determines similarities between sampled frames by determining distances between feature vectors for the samples frames. The system then uses the determined similarities to select a sampled frame to represent the video, wherein the selected frame is most similar to the other sampled frames in the video.

System

Figure 3:
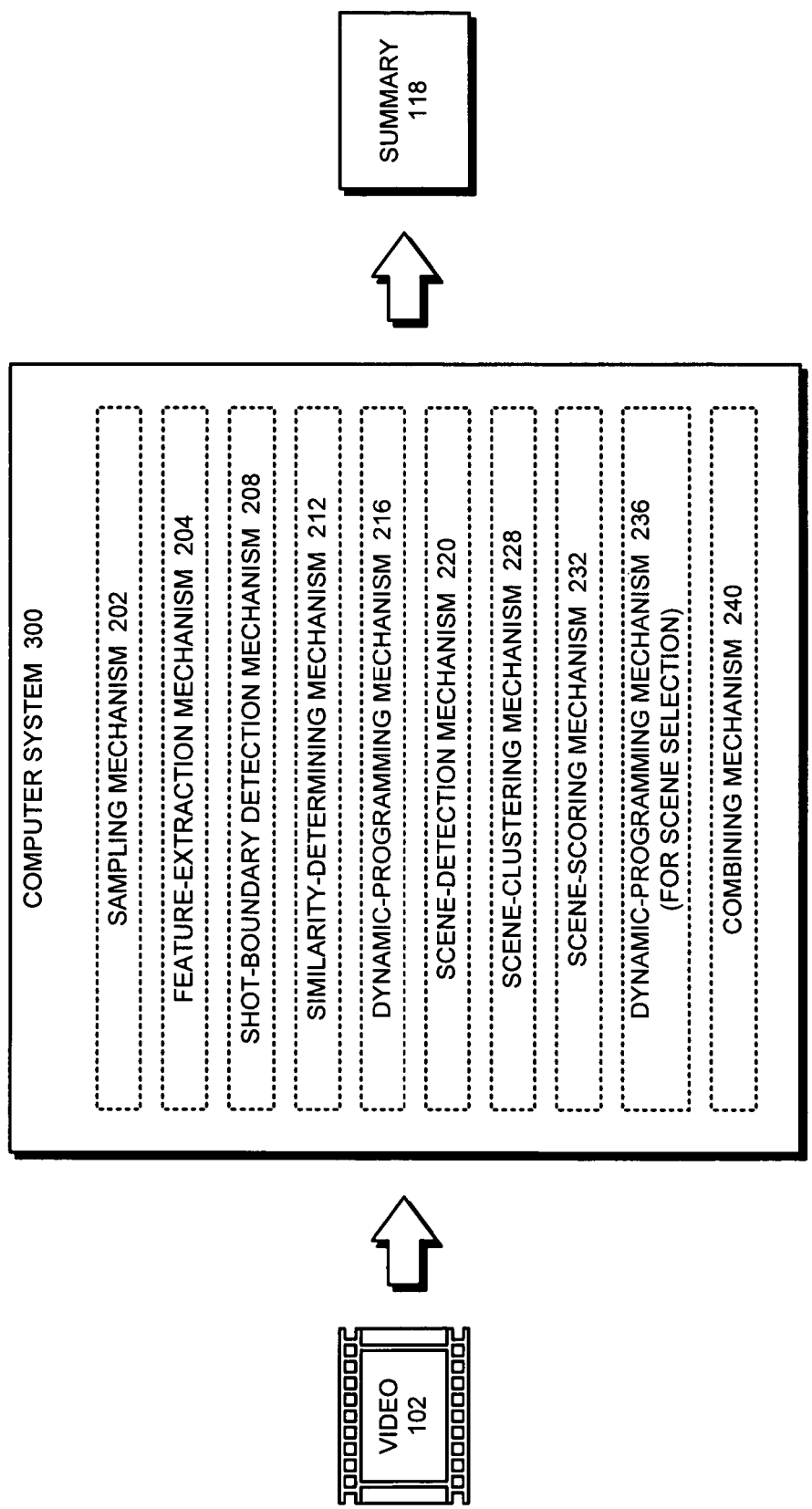
FIG. 3 illustrates a system for summarizing a video in accordance with an embodiment of the present invention.

FIG. 3 illustrates a computer-based system for summarizing a video in accordance with an embodiment of the present invention. This computer-based system operates within a computer system 300, which can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 3, computer system 300 includes a number of software modules that implement: sampling mechanism 202, feature-extraction mechanism 204, shot-boundary-detection mechanism 208, similarity determining mechanism 212, dynamic-programming mechanism 216, scene-detection mechanism 220, scene-clustering mechanism 228, scene-scoring mechanism 232, dynamic-programming mechanism 236 and combining mechanism 240. These mechanisms operate collectively to produce a summary 118 for a video 102.

Applications

The summaries produced by the present invention can be used in a number of different ways, some of which include:

(1) Video summaries can be used to provide previews for paid videos. There are typically restrictions on how much of a paid video can be shown to potential buyers. Living within these restrictions, the system can automatically generate video previews to be shown as trailers for to potential buyers for the paid videos.

(2) Video summaries can be useful to a user who missed a whole series or some episodes of their favorite show. The system can generate a summary for those episodes that fits within an amount of time that the user is willing to spend to catch up with the series.

(3) A video summary can comprise a single frame, which is displayed as a representative of the video within search results. The above-described techniques can be used the select a frame which best reflects the content of the video. In a related application, while the video is being played back, the system can display key frames from the interesting parts of the video to serve as anchor points for fast browsing through the video.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The invention claimed is:

1. A method for automatically producing a summary of a video, comprising:
    partitioning a video into scenes using a frame-similarity matrix, each element in the frame-similarity matrix representing a distance between feature vectors of a corresponding pair of frames;
    generating a scene-similarity matrix comprising a plurality of elements based on the frame-similarity matrix, each element of the scene-similarity matrix representing a measure of similarity between different scenes of the video;
    determining, by a processor, an importance score for each scene based on the scene-similarity matrix, motion data associated with the scene, and audio data associated with the scene, an importance score for a scene indicating a relative importance of the scene, wherein the importance score increases responsive to the scene having a high similarity with other scenes in the video and increases responsive to the scene having a high distance from a measure of a mean cohesiveness of the video;
    selecting representative scenes from the video based on the determined importance scores; and
    combining selected scenes to produce the summary for the video.

2. The method of claim 1, wherein each feature vector comprises a color histogram of a frame.

3. The method of claim 1, wherein an element in the frame-similarity matrix comprises a distance between two feature vectors $F_A$ and $F_B$, wherein the distance is calculated as $$1 - \frac{F_A * F_B}{|F_A||F_B|}.$$

4. The method of claim 1, wherein the scene-similarity matrix is generated by detecting shot boundaries using an adaptive-threshold technique which computes a distance between feature vectors for successive frames divided by a maximum distance between successive feature vectors in a preceding window of frames.

5. The method of claim 1, wherein selecting a scene from the video comprises clustering similar scenes together and selecting at most one scene from each cluster.

6. The method of claim 1, wherein selecting a representative scene from the video comprises using a dynamic-programming technique to select the scene.

7. The method of claim 1, wherein selecting representative scenes from the video comprises selecting the representative scenes based on a total importance score for the selected scenes subject to a time constraint.

8. A non-transitory computer-readable storage medium storing instructions that, when executed by a computer, cause the computer to perform a method for automatically producing a summary of a video, the method comprising:
    partitioning a video into scenes using a frame-similarity matrix, each element in the frame-similarity matrix representing a distance between feature vectors of a corresponding pair of frames;
    generating a scene-similarity matrix comprising a plurality of elements based on the frame-similarity matrix, each element of the scene-similarity matrix representing a measure of similarity between different scenes of the video;
    determining an importance score for each scene based on the scene-similarity matrix, motion data associated with the scene, and audio data associated with the scene, an importance score for a scene indicating a relative importance of the scene, wherein the importance score increases responsive to the scene having a high similarity with other scenes in the video and increases responsive to the scene having a high distance from a measure of a mean cohesiveness of the video;
    selecting representative scenes from the video based on the determined importance scores; and
    combining selected scenes to produce the summary for the video.

9. The computer-readable storage medium of claim 8, wherein each feature vector comprises a color histogram of a frame.

10. The computer-readable storage medium of claim 8, wherein an element in the frame-similarity matrix comprises a distance between two feature vectors $F_A$ and $F_B$, wherein the distance is calculated as $$1 - \frac{F_A * F_B}{|F_A||F_B|}.$$

11. The computer-readable storage medium of claim 8, wherein the scene-similarity matrix is generated by detecting shot boundaries using an adaptive-threshold technique which computes a distance between feature vectors for successive frames divided by a maximum distance between successive feature vectors in a preceding window of frames.

12. The computer-readable storage medium of claim 8, wherein selecting a scene from the video comprises clustering similar scenes together and selecting at most one scene from each cluster.

13. The computer-readable storage medium of claim 8, wherein selecting a representative scene from the video comprises using a dynamic-programming technique to select the scene.

14. The computer-readable storage medium of claim 8, wherein selecting representative scenes from the video comprises selecting the representative scenes based on a total importance score for the selected scenes subject to a time constraint.

15. An apparatus that automatically produces a summary of a video, comprising:
    a non-transitory computer readable storage medium storing instructions executable to perform steps comprising:
        partitioning a video into scenes using a frame-similarity matrix, each element in the frame-similarity matrix representing a distance between feature vectors of a corresponding pair of frames;
        generating a scene-similarity matrix comprising a plurality of elements based on the frame-similarity matrix, each element of the scene-similarity matrix representing a measure of similarity between different scenes of the video;

determining an importance score for each scene based on the scene-similarity matrix, motion data associated with the scene, and audio data associated with the scene, an importance score for a scene indicating a relative importance of the scene, wherein the importance score increases responsive to the scene having a high similarity with other scenes in the video and increases responsive to the scene having a high distance from a measure of a mean cohesiveness of the video;

selecting representative scenes from the video based on the determined importance scores; and combining selected scenes to produce the summary for the video; and a processor configured to execute the instructions.

16. The apparatus of claim 15, wherein each feature vector comprises a color histogram of a frame.

17. The apparatus of claim 15, wherein an element in the frame-similarity matrix comprises a distance between two feature vectors $F_A$ and $F_B$, wherein the distance is calculated as $$1 - \frac{F_A * F_B}{|F_A||F_B|}.$$

18. The apparatus of claim 15, wherein the scene-similarity matrix is generated by detecting shot boundaries using an adaptive-threshold technique which computes a distance between feature vectors for successive frames divided by a maximum distance between successive feature vectors in a preceding window of frames.

19. The apparatus of claim 15, wherein selecting a scene from the video comprises clustering similar scenes together and selecting at most one scene from each cluster.

20. The apparatus of claim 15, wherein selecting representative scenes from the video comprises selecting the representative scenes based on a total importance score for the selected scenes subject to a time constraint.

21. The method of claim 1, wherein the distance from the measure of the mean cohesiveness of the video indicates how distinct the scene is from other scenes in the video.

\* \* \* \* \*